Jan. 6, 1931. A. MARCUSON 1,787,693
AUTOMOBILE SIGNAL
Filed Nov. 16, 1928 2 Sheets-Sheet 1
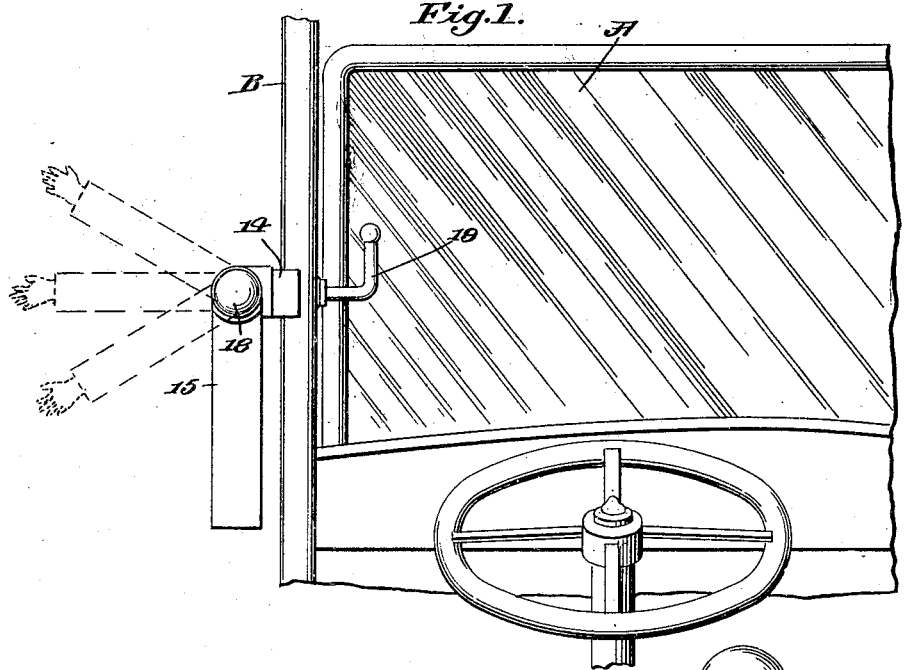
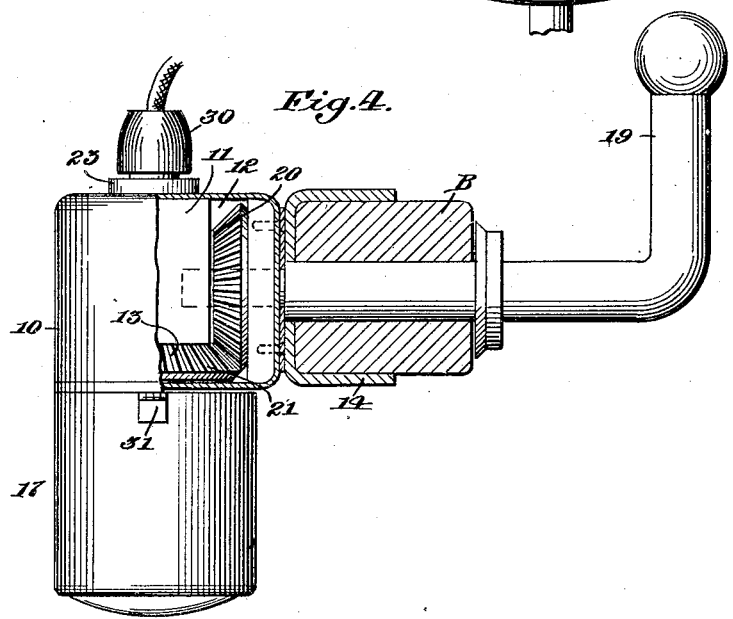
Inventor:
Alfred Marcuson,
Att'y.

Jan. 6, 1931.  A. MARCUSON  1,787,693
AUTOMOBILE SIGNAL
Filed Nov. 16, 1928  2 Sheets-Sheet 2
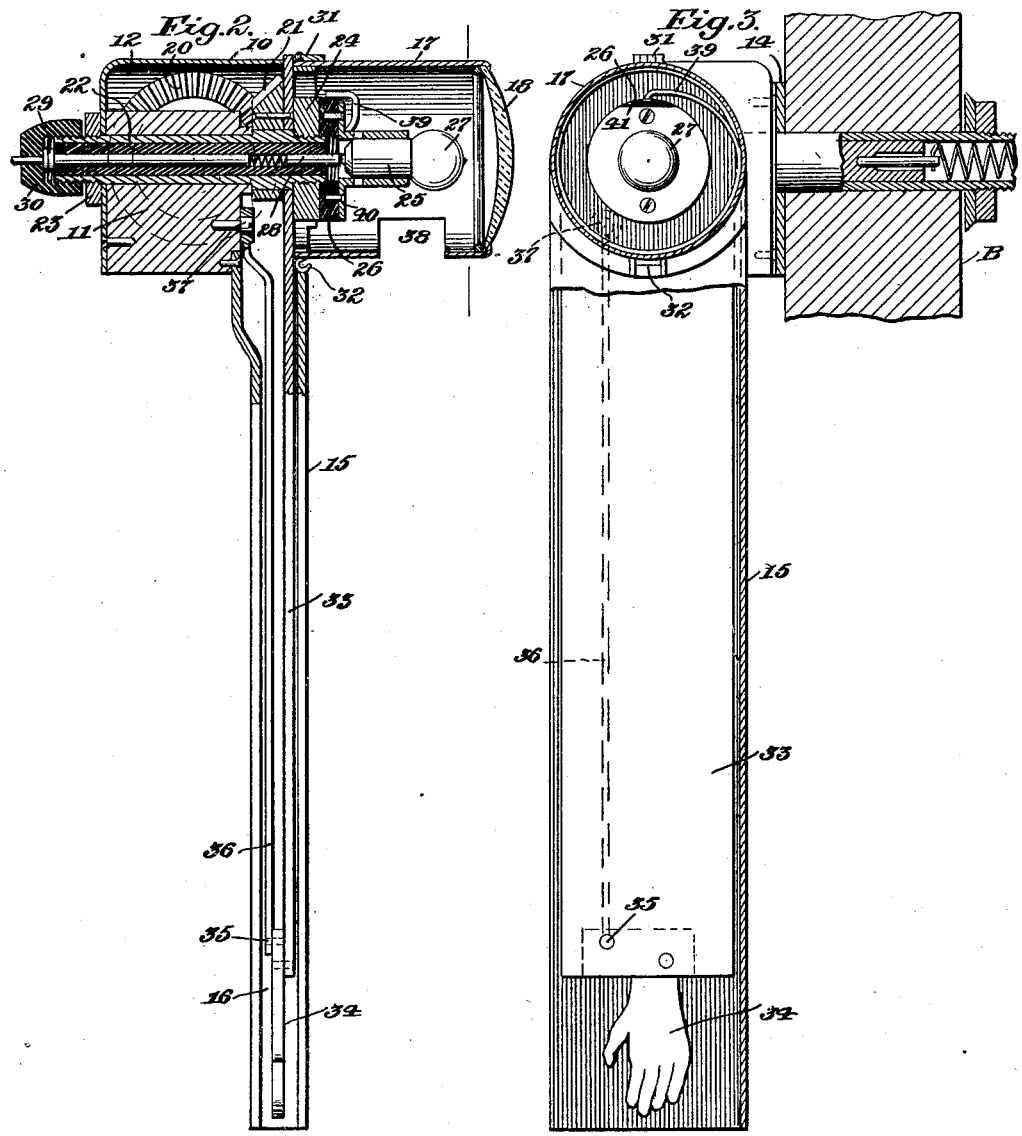

Patented Jan. 6, 1931

1,787,693

UNITED STATES PATENT OFFICE

ALFRED MARCUSON, OF EXETER, CALIFORNIA

AUTOMOBILE SIGNAL

Application filed November 16, 1928. Serial No. 319,847.

The invention relates to an automobile signal, and more especially to the class of direction indicators for use on vehicles, particularly automobiles.

The primary object of the invention is the provision of a signal or indicator of this character, wherein the construction thereof is of a kind to permit the attachment of the same to a vehicle without requirement of any changes or alterations in the standard make-up of such vehicle and will signal or indicate to the traffic following said vehicle the direction or course of the latter or whether a decrease in speed or a stop is to be effected.

Another object of the invention is the provision of a signal or indicator of this character, wherein on the attachment of the same to a vehicle it can be readily and conveniently operated at the will of the driver or user of the latter, thereby issuing selected signals indicative of the direction of travel and speed of the vehicle as well as bringing of the vehicle to a standstill, the signal or indicator being of novel form to assure of maximum visibility effective signalling.

A further object of the invention is the provision of a signal or indicator of this character, wherein automatic illumination of the same may be had, and this being under the control of the driver or user of the vehicle.

A still further object of the invention is the provision of a signal or indicator of this character, wherein a swinging element can be actuated to indicate to advancing traffic the course of the vehicle bearing the signal or indicator, the element when at rest in nonsignalling position is concealed, while the light signal is in full view, so that when illuminated is clearly visible to oncoming traffic.

A still further object of the invention is the provision of a signal or indicator of this character, which is extremely simple in construction, possessing but few parts, thus enabling easy assemblage and attachment to a vehicle, thoroughly reliable and efficient in its operations, strong, durable, and inexpensive to manufacture and install.

With these and other objects in view the invention consists in the features of construction, combination and arrangement of parts as will be hereinafter more fully described, illustrated in the accompanying drawings, showing the preferred embodiment of the invention, and pointed out in the claim hereunto appended.

In the accompanying drawings:

Figure 1 is an elevation of the wind-shield of an automobile, showing the signal or indicator constructed in accordance with the invention attached, the swinging element of the signal or indicator being shown by dotted lines in its three signalling positions.

Figure 2 is an enlarged vertical transverse sectional view through the signal or indicator.

Figure 3 is a fragmentary elevation partly in section.

Figure 4 is a top plan view partly in section.

Similar reference characters indicate corresponding parts throughout the several views in the drawings.

Referring to the drawings in detail A, designates generally a portion of the wind-shield of an automobile, which is of the usual construction, and B, one side support or upright therefor, which is ordinarily carried by the body of the vehicle.

Adapted to be removably supported upon the support or upright B, is the signal or indicator, which comprises a casing or housing 10, preferably made from sheet metal, although it may be made from any other material, having suitably fixed therein a bearing 11, provided at two sides thereof, these being at right angles to each other, and have gear spaces or chambers 12, and 13, respectively. The casing or housing 10, is carried on a bracket 14, of any desirable kind, which is adapted to be detachably engaged on the support or upright B, for the mounting of the signal or indicator in proper position.

Fixed to and depending from the casing or housing 10, substantially vertical and parallel with the upright or support B, is a channeled guard 15, the channel 16, therein opens laterally from the vehicle outwardly through the outer edge of said guard. Facing rearwardly of the vehicle and located at the upper end of the guard 15, in alignment with the casing or housing 10, is a lamp house 17, provided with a lens or bull's-eye 18.

Truncated in the bearing 11, in the casing or housing 10, and suitably journaled in the latter is a hand crank 19, which is in convenient reach of the driver of the vehicle, the inner end portion of the crank within the space 12, being fitted with a beveled gear 20, this meshing with a companion beveled gear 21, at right angles thereto. The gear 21, is rotatably supported upon a tubiform axle 22, mounted in the bearing 11, and carried forwardly through the casing or housing 10, and rearwardly into the lamp house 17. This axle 22, is removably held in place through the medium of retaining nuts 23 and 24, respectively.

Within the lamp house 17, is an electric light socket 25, which is in alignment with the axle 22, but insulated therefrom by an insulating washer 26, the socket 25, being fitted with an electric bulb 27, while within the axle 22, and insulated therefrom is a central electrical contact 28, which at its outer end is engaged with the terminal 29, of an electric lead from a source of current, the terminal being held in a cap 30, detachably threaded on the outer end of the axle 22.

The lamp house 17, is hinged at 31, to the guard 15, so that said house can be opened for access to the bulb 27, the house being held closed by a latch 32.

Normally concealed in the guard 15, and fixed to the gear 21, is a swinging signal or indicator arm 33, on the free end of which is pivoted a hand 34, the gear 21, when rotated moving the arm 33, to the positions shown by dotted lines in Figure 1, of the drawings or to concealed position with the guard 15.

To change the relation of the hand 34, with respect to arm 33, there is pivotally connected at 35, with said hand a shift rod 36, which is eccentrically pivoted at 37, to the bearing 11, relative to the axis of movement of the gear 21, which will be clearly apparent from the showing in Figure 1, of the drawings.

The lower portion of the lamp house 17, is cut-away to provide a light slot or opening 38, to permit light emitted by the bulb 27, to illuminate the arm 33, when the same leaves the guard 15.

Extending into the lamp house 17, is a spring contact 39, which engages the insulation washer 26, and is adapted to wipe the outer periphery of the base flange 40, of the light socket 25, the flange being mutilated at 41, so that as the arm 33, is swung to signalling position the contact will act as a switch to close the circuit to the bulb 27, by grounding through the vehicle frame, but when said arm 33, is positioned in the guard 15, the mutilated portion 41, of the flange 40, is immediately below the contact 39, and the flange out of engagement with the latter, thereby opening or breaking the circuit to the bulb, as will be apparent from the showing in Figure 3, of the drawings.

It is of course understood that the contact 39, is formed from the inner end of the arm 33, and moves therewith when the arm is actuated on manipulation of the hand crank 19, by the driver or user of the vehicle.

In the operation of the signal or indicator by turning the crank 19, the arm 33, and its hand 34, can be shifted from normally concealed position within the guard 15, to any selective signalling position shown by dotted lines in Figure 1, of the drawings.

The position of the arm 33, and its hand 34, can be indicative of varying directions of travel of the vehicle as well as the slowing of the speed of the same or the stopping thereof.

The electric lead from the terminal 30, can be equipped with a suitable control switch, not shown, for control of the illumination of the bulb 27, at the will of the driver or user of the vehicle.

From the foregoing it is thought that the construction and manner of operation of the signal or indicator will be clearly understood, and therefore a more extended explanation has been omitted.

However, it is to be understood that changes, variations and modifications of the invention can be made as come properly within the scope of the appended claim, without departing from the spirit of the invention or sacrificing any of its advantages.

What is claimed is:

In a signal of the kind described, a casing adapted to be mounted upon a support, and having a bearing therein forming chambers at right angles to each other, a channeled guard fixed to and depending from the casing, an operating shaft journaled in the bearing, meshing gears in the respective chambers, one gear being fixed to the shaft, a swinging signal arm, the other gear being fixed to the arm, and when actuated moves the latter into and out of the channeled guard, a hand pivoted eccentrically to the free end of the arm, and a shift rod pivoted eccentrically to the bearing and to the hand for shifting the latter on relative movement of the signal arm.

In testimony whereof I affix my signature.

ALFRED MARCUSON.